United States Patent
Chiang et al.

(10) Patent No.: US 8,315,809 B2
(45) Date of Patent: Nov. 20, 2012

(54) **BIO-EXPRESSION SYSTEM WITH MODULE FOR CREATING THE STANDARD *DROSOPHILA* BRAIN MODEL AND ITS COORDINATE SYSTEM**

(75) Inventors: Ann-Shyn Chiang, Hsin Chu (TW); Yung-Chang Chen, Hsin Chu (TW); Hsiu-Ming Chang, Hsin Chu (TW)

(73) Assignee: National Tsing Hua University, Hsin Chu (TW)

( * ) Notice: Subject to any disclaimer, the term of this patent is extended or adjusted under 35 U.S.C. 154(b) by 762 days.

(21) Appl. No.: 12/222,813

(22) Filed: Aug. 18, 2008

(65) Prior Publication Data

US 2009/0063119 A1 Mar. 5, 2009

Related U.S. Application Data

(63) Continuation-in-part of application No. 11/169,890, filed on Jun. 30, 2005, now Pat. No. 7,742,878.

(51) Int. Cl.
*G06F 7/00* (2006.01)

(52) U.S. Cl. .............. 702/19; 702/20; 703/11; 707/700; 435/6.1

(58) Field of Classification Search .................. None
See application file for complete search history.

(56) References Cited

U.S. PATENT DOCUMENTS 6,381,562 B2 * 4/2002 Keane ............................ 703/11

* cited by examiner

*Primary Examiner* — Mary Zeman
(74) *Attorney, Agent, or Firm* — Bacon & Thomas, PLLC

(57) ABSTRACT

A method of generating standard brain model from a bio-expression system includes performing steps of registration to input standard surface and individual surface into affine registration; recording a transformation parameters from the affine registration; performing steps of inputting a individual neuropil and transform parameters into an affine transformation; applying the data of the affine transformation to transform individual neuropil to achieve transformed individual neuropil; and performing a step of affine registration to register a standard neuropil to the transformed individual neuropil to achieve a resulting transformation, wherein the resulting transformation can be output as a position and orientation of standard neuropil within the standard surface.

10 Claims, 7 Drawing Sheets

BIO-EXPRESSION SYSTEM WITH MODULE FOR CREATING THE STANDARD *DROSOPHILA* BRAIN MODEL AND ITS COORDINATE SYSTEM

The application is a continuation-in-part of a pending application, Ser. No. 11/169,890, entitled Bio-Expression System and the method of the same, filed on Jun. 30, 2005.

FIELD OF THE INVENTION

The present invention relates to a system of bio-expression, and more specifically, to a system having module for creating the standard drosophila brain model and the coordinate system.

BACKGROUND OF THE INVENTION

Genetic and behavioral analysis has been developed for identifying the function of genes. For example, numerous methods are developed in effort for disease modeling, such as the production of germ-line transgenic animal models (e.g. transgenic mice and other animals with specific genetic characters). However, practically, a major obstacle in performing gene/disease analysis on transgenic mammals is the long life span of animals. It takes too long (a few years at least) in the laboratory to trace diseases evolving from abnormal genes in one animal. Many researches on disease treatments could be delayed because scientists had not a swift and easy access to the source of pathogenesis at the molecular level for accurate identification. One remedy for the situation is to utilize some relevant systems in short life-spanned (only days from birth to mature) insects as models. For example, the brain of fruit flies (*Drosophila melanogaster*) has been used to investigate the pathogenesis of Alzheimer disease. Please refer to the article "A *Drosophila* model of Alzheimer's disease: dissecting the pathological roles of A$\square$42 and A$\square$40", to K. Iijima, Proc. Natl. Acad. Sci. USA, vol. 101, 6623-6628, 2004. Likewise, studies on early detection and treatment of numerous diseases may become more efficient in the future if a good correlation among genes, cellular structures and diseases can be established successfully in a fly model. The benefit resulted will be not only on science but also on public health that many new treatments with better accuracy can be found for diseases, especially for those are gene related.

Up to now, no research or application employs the computer-assisted system to inspect the real environment at the cellular level in biotechnology, although some applications relate to computerized medical diagnostic systems are available. New technology is needed to help observing the wholeness of the article at its finest level that cannot be detected by the conventional optical technology. Recently, three-dimension reconstruction technology has been developed that allows rebuilding the three dimensional image of cells, thereby providing the tool to understand the fine structure of them. However, such technology focuses on a single cell or only few cells cultured in an artificial environment (in vitro) instead of in the real body (in vivo). The difference between the two environments is more significant in the field of neural science. The distribution of neurons is really three-dimensional in the body, but they are plated in a two-dimensional situation in cell cultures. It is unlikely that a two-dimensional environment simulates the three-dimensional neural networks in the body. Currently, some approaches struggle to observe the neural system in three-dimensional environment. However, the approaches are restricted by the penetration depth of the optical system that is hardly capable of looking through the depth deeper than 50-micron meter by using visible light.

In the likewise studies, the fruit fly has become one of the prime model systems in brain research. Its brain (about 600× 250×150 micrometers) consists of about 200,000 neurons. Given this relatively small brain, the fly shows a surprisingly complex repertoire of behaviors, e.g. orientation, courtship, learning and memory. The whole brains were dissected from heads, sliced and labeled fluorescently for inspections. However, in this way and in all prior methods, the whole neural circuitry in the fly brain is impossible to be reconstructed reasonably due to its physical damages from tissue slicing and the limited depth of view in each observation. Our invention provides a complete and novel resolution to overcome this barrier.

Virtual reality technology has progressed into practical and useful applications. These applications have found utility in a wide variety of fields and industries. One application is known as training and researching applications. Virtual reality training applications allow users to develop important skills and experience without subjecting them to the hazards or costs of training. Virtual reality is a computer-generated environment in which a user is immersed. Actions of the user are translated by a computer into inputs that effect the virtual environment (VE). Virtual reality systems may stimulate naturally occurring senses, so that a user can navigate through a virtual environment as if in the real world. However, never a virtual reality system has been used to explore the cellular networks in a biological tissue at high resolution (in the range of few micrometers).

Although images of biological cells at high resolution have been available for a long time but hardly any cellular network (such as neural networks in an intact brain) has been revealed anatomically, let along interactions among different networks. Current technology for medical imaging is capable of generating series of images for database construction, however not only the revelation of cellular structures are not intended but also the genetic information is hardly associated with the anatomy. Therefore, our purpose is to provide a way of combining high resolution biological structural database (such as neural networks), system of gene (protein) expression in biological tissues and a visual demonstration in virtual reality. Such a system should be modular to allow expansion for multiple types of gene (protein) expression to correlate the anatomy and the function (or dysfunction) to the molecular level. In this way, the correlations among genes, cellular networks and biological functions can be examined and manipulated in the most realistic environment. Biological function simulation may be achieved when detailed cellular networks and genetic information are realistically available.

Recently, biologists are eager to understand how a complete brain functions to control behavior, cognition, learning and memory. In order to reveal the specific neural circuit and eventually the circuits of the whole brain, a reference template is needed for data integration and comparison. A probabilistic atlas has been proposed as a representation for the Drosophila brain. See R. Brandt, T. Rohlfing, J. Rybak, S. Krofczik, A. Maye, M. Westerhoff, H.-C. Hege, and R. Menzel "Three-dimensional average-shape atlas of the honeybee brain and its applications," Journal of Comparative Neurology, vol. 492, no. 1, pp. 1-19, 2005. It provides only a boundary for statistical confidence instead of an absolute anatomic shape and position. The probabilistic atlas is versatile and suitable for distinguishing normal brains from abnormal ones but it is not suitable in serving as a common coordinate system. Heisenberg et al. proposed a standard Drosophila brain model which is also a voxel-based probabilistic atlas. Please refer to K. Rein, M. Zockler, M. T. Mader, C. Grubel, and M. Heisenberg, "The Drosophila standard brain" Current Biology, 12, pp. 227-231, 2002. It is constructed from the superposition of rigid-registered neuropils but no coordinates. For systematic collections of warped individual neuronal images in a common template, a deterministic reference template is necessary instead of the probabilistic atlas. Since the result of warping is highly dependent on the disparity between the template and the individual, a good reference template should have as small disparity to all the individuals as possible on average.

What is required is a procedure for generating the standard Drosophila brain model to serve as a common coordinate system for the fly brain neurology.

SUMMARY OF THE INVENTION

In view of the above-mentioned, the object of the present invention is to disclose a system of bio-expression including a module for creating the standard drosophila brain model and the coordinate system.

A further object of the present invention is to provide a method including a module for creating the standard drosophila brain model and the coordinate system.

A method of generating standard surface and neuropils model from a bio-expression system comprises performing steps to input a first individual model and a second individual model to the bio-expression system; processing the input first individual model and second individual model by a coarse-level model averaging; transforming the first individual model and a second individual model to corresponding pseudo-average models; and creating a signed distance field from the pseudo-average models, wherein the signed distance field records the distance from each voxel to its nearest voxel on the surface of the pseudo-average models.

The method further comprises a step of extracting a surface of a final standard model after cumulating the signed distance field of all pseudo-average models.

The global characteristics are averaged during the step of the coarse-level model averaging, wherein the global characteristics includes orientations, positions, sizes, and angles between axial structures. The final standard model is obtained by determining the shape average of the pseudo-average model.

A method for generating standard brain model from a bio-expression system comprises determining a global coordinate to present the entire standard brain model; determining a local coordinate to present a sub-structure of the standard brain model; and determining characteristics of the local coordinate with respect to the global coordinate. The origin of the global coordinate is first defined. Other characteristics include position of the local coordinate to the origin, the orientation of the local coordinate and the angle between axial structures of the local coordinate within the global coordinate.

A method of generating standard brain model from a bio-expression system comprises performing steps of registration on input standard surface and individual surface through affine registration; recording a transformation parameters from the affine registration; performing steps of inputting an individual neuropil and transform parameters for affine transformation; applying the same affine transformation to transform individual neuropils to achieve the transformed individual neuropils; and performing a step of rigid transformation to register a standard neuropil to the transformed individual neuropil to achieve a resulting transformation, wherein the resulting transformation can be output as one possible position and orientation of standard neuropil within the standard surface.

The standard brain includes the standard surface and the standard neuropil. The standard neuropil is located within the standard surface with averaged position and orientation, calculated by averaging all possible positions and orientations from individual datasets. The standard brain model is obtained after all the standard neuropil are processed and located into the standard surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
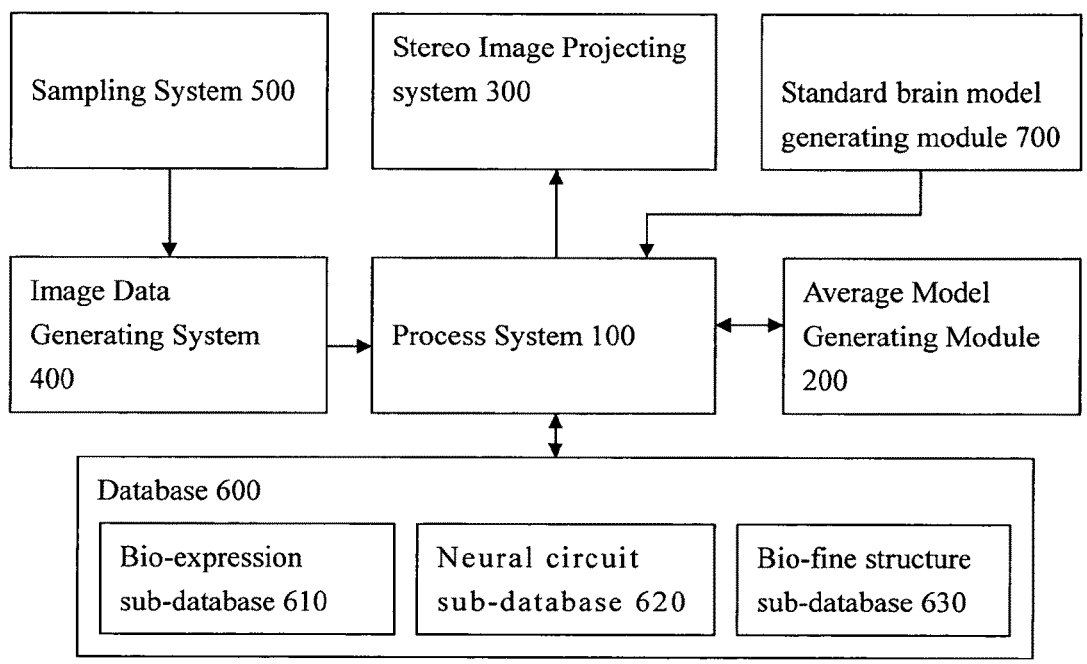
FIG. 1 illustrates the system diagram according to the present invention.

Referring now to the drawings and the following description wherein the showings and description are for the purpose of illustrating the preferred embodiments of the present invention only, and not for the purpose of limiting the same. The present invention provides cellular networks database and system for gene expression in the bio-organization, one preferred example is gene expression in fruit fly brains. Such an expressing system should be modular to allow expansion for multiple types of gene with different functions.

System of Presenting the Gene Expression

Please refer to FIG. 1, the bio-expression system 10 of the present invention includes a computing process system 100 used to process and compute the data and information under certain instruction. The bio-expression system collects and presents the bio-characters. In one example, the system may allow to analyze and define a neural circuit involved in any scientific investigation, medical-related diagnosis or artistic exhibition. As know in the art, the high-performance computer with advance CPU could be employed to achieve the goal. An average model generating module 200 is embedded in the process system 100 to transfer the input two-dimension image data such as a set of individual model sections to a three-dimension image. In one preferred embodiment, one commercial product application or software AMIRA (v3.1, Mercury Computer Systems Inc. USA) could be introduced to achieve the purpose. As known in the art of the three-D graphic technology, the image data could be calculated by the process system 100 introducing the average model generating module 200 to generate reconstructed three-dimension stereoscopic image.

Initially, the input data is prepared by the sample preparation system 500 and the image data generating system 400. The sampling system 500 1 is employed to generate the target sample for the bio expression system 10. In one embodiment, the fruit fly brain (about 600×250×150 micrometers in its adult brain) is used for illustration. As will be understood by persons skilled in the art, the foregoing preferred brain organization of the fly embodiment is illustrative of the present invention rather than limiting the present invention. The whole tissue of fly brain can be obtained by the well-know manner, followed by increasing its degree of light transparency to about 0.15 mm or deeper with a technique invented by one of our inventors, please refer to the U.S. Pat. No. 6,472,216 B1, filed on Oct. 29, 2002, entitled "Aqueous Tissue Clearing Solution". The reference is cited herein for reference. Fluorescent marking or labeling molecules are implanted to label a predetermined portion of the target sample such as some neurons underlie a specific function. The procedure could be achieved by means of genetic engineering, as well known in the art.

Subsequently, the prepared sample is fed to the image data generating system 400. The system 400 includes a laser scanning microscope that is equipped with a plurality of laser light sources. During the procedure, the sample with label is scanned by the laser to activate fluorescent molecules. The cross-sections of the sample at different depth are scanned entirely (or partially) with the laser according to a predetermined sequence. Therefore, the scanned image data include pluralities of surface images at different depth. Images from various parts of the same cross-section can be stitched to its entirety with the help of computer software such as AMIRA. Thereafter, the generated image data are fed in to the process system 100 for subsequent process. As aforementioned, the average model generating module 200 is coupled to the process system 100 to process the input data for generating the three-dimension image or an average model.

The generated average model or three-dimension image data could be stored in the database 600. The database may include a plurality of sub-database such as bio-express sub-database 610, cellular network sub-database 620 and bio-fine structure sub-database 630. As will be understood by persons skilled in the art, the foregoing preferred embodiment is illustrative of the present invention rather than limiting the present invention.

The bio-expression sub-database 610 includes the data of bio-character such as gene (or protein) expressions. The database 610 also includes standard bio-geographic index sub-database, which allows the calibration and comparison between different individuals. All of the data can be classified in accordance with gene (or protein) expressions, individual growth, developmental, disease or experience dependent procedures.

Cellular network sub-database 620 establishes a functional linkage between certain functions (or dysfunctions) and cellular entities. For example, the transient inhibition of NMDA receptors in neurons disrupts a certain type of memory formation, establishing a function link between memory and neurons identified by the Feb170 enhancer trap allele. Please refer to the article "Specific requirement of NMDA receptors for long-term memory consolidation in Drosophila ellipsoid body" in Nature Neuroscience, 2007 December;10(12): 1578-86. The article is incorporated herein for reference. The fine structure sub-database 630 includes the data of bio-fine structures.

Figure 6:
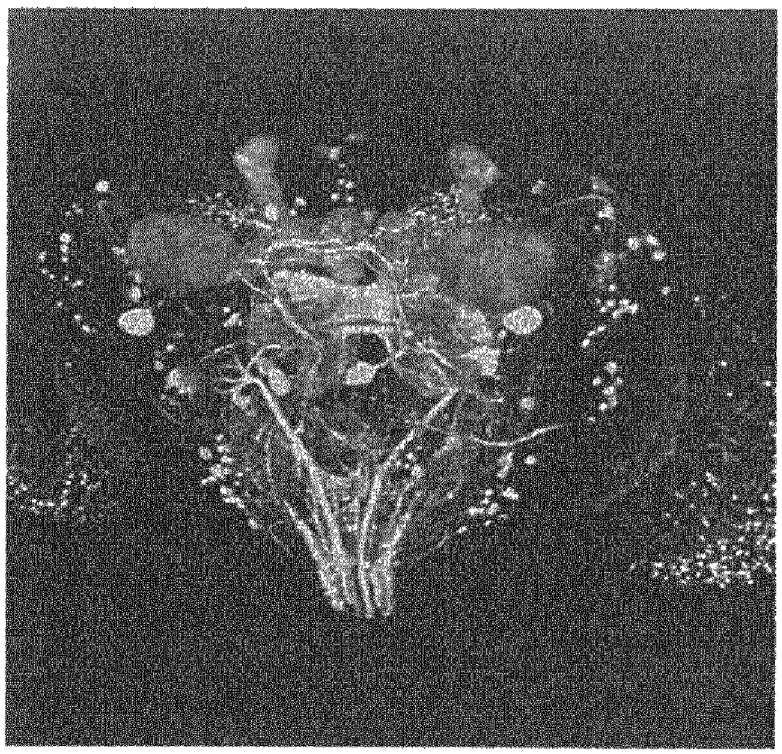
FIG. 6 illustrates an example of the generated 3D sub-structures and neural networks in the fly brain.
Figure 7:
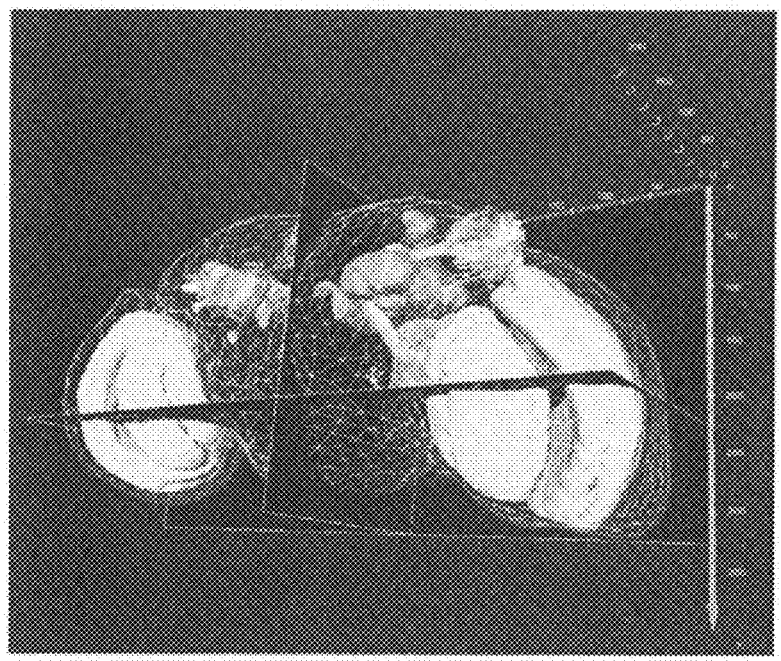
FIG. 7 demonstrates an average model of a fruit fly brain with some of its major sub-structures.
Figure 8:
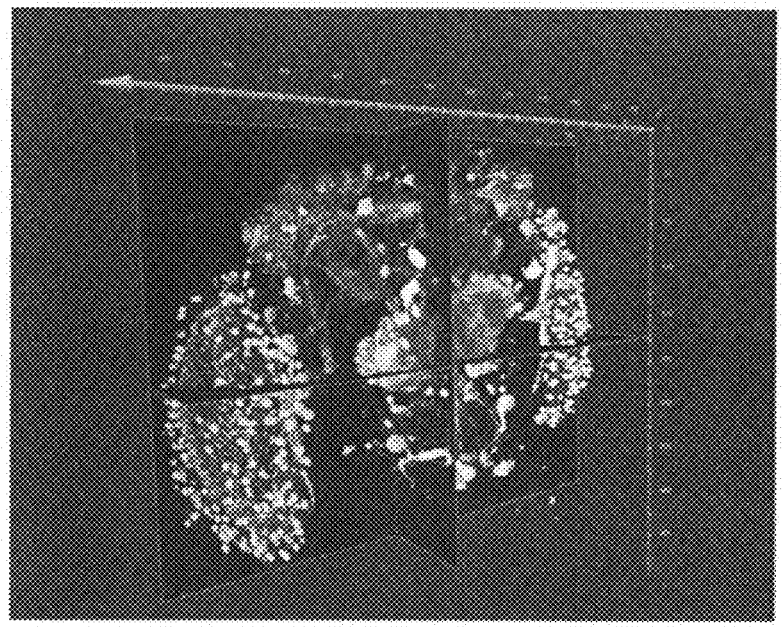
FIG. 8 demonstrates the distribution of some genes within neural networks in a fly brain.

One preferred embodiment is to construct some databases for the fruit fly brain. The gene expression of the fly brain can be presented by the Ga14/UAS-GFP technology, as well known by skilled persons in the art. FIG. 6 illustrates an example of the generated 3D fly brain incorporated herein for reference. The figure shows a 3D image illustrating the distribution of the neurons which express the C133 gene in a brain of a male fruit fly. The green color portion represents the expression of C133 gene resulted from the fluorescent marking molecule. The larger spots are neurons with a width at about 10 micrometers, while smallest dots are believed to be the synapses, at the size of micron range. The brown color portion is the mushroom body. The averaged standard mushroom body is constructed according to the algorithm used in the average-model module in the process system. All cells can be set in the computed standard brain wireframe by the 3D image generating technology. FIG. 7 shows the location of neurons expressing the GH146 gene (orange) in a standard fly brain model constructed according to its mushroom body (purple). The yellow part is the optical lobe where the visual signal is collected. The blue part is called the central complex. In FIG. 8, several cellular networks expressing different genes in one brain is illustrated, GH146 (green), tim (brown), and 201Y (purple). The tim gene is related to the biological clock in the fruit fly.

From the FIGS. 6 to 8, the bio-structure image can be obtained by means of the present invention. The bio-network images can be stored in a storage medium. The present invention discloses a computer readable storage medium being available to store an image of bio-network generated by performing the following scanning a sample with label by a laser scanning microscope to activate fluorescent molecules in the sample, wherein the laser scanning microscope is equipped with a plurality of laser light sources; during the scanning procedure, at least a part of the sample is scanned by the laser light and cross-sections at different depth are scanned according to a predetermined sequence, thereby obtaining scanned image data including pluralities of surface images at different depth. The images from various parts of the same cross-section can be stitching to its entirety. Objects in three dimensions can be reconstructed by the utilization of computer software such as AMIRA. The present invention further comprises the following steps before scanning the sample: preparing the sample and implanting molecules of fluorescence generating potential in the sample to label a predetermined portion of a target sample by means of genetic engineering. Then, the degree of light transparency of the sample is increased to about 0.15 mm or deeper.

Figure 2:
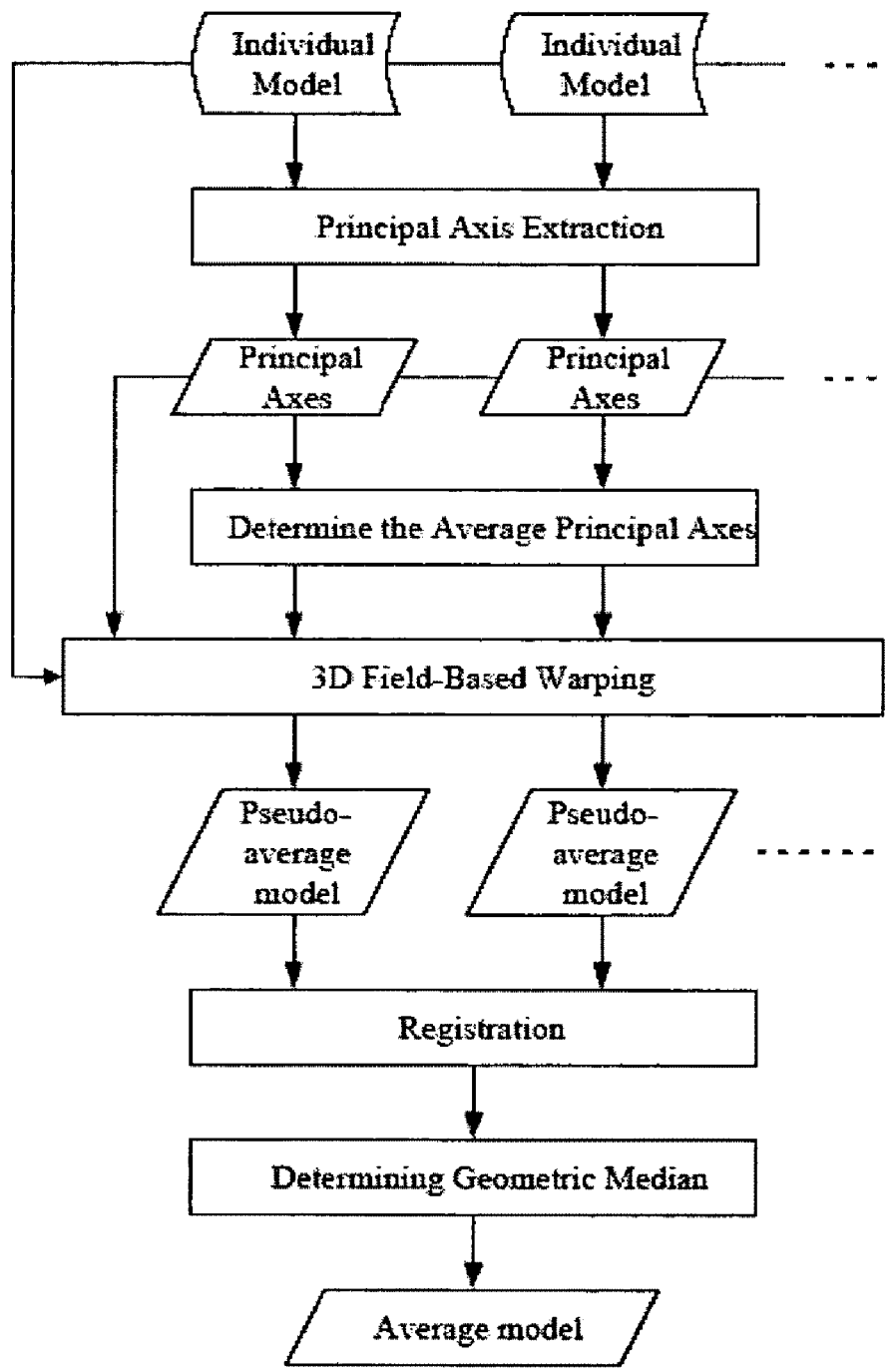
FIG. 2 is the flow chart according to the present invention.

Please refer to FIG. 2, a proposed process flow is to build an average model (3D atlas) from a group of initial individual models. As shown in FIG. 2, the method consists of three main steps, individual model construction and two model-averaging procedures at different levels. The first step is to construct 3D wireframe model for each individual dataset.

Individual Model

After performing 2D segmentation, contour extraction and contour correspondence analyses to the original datasets, applying surface models reconstruction algorithms can yield wireframe model for individual representations. This can be achieved with the help of computer software such as AMIRA.

Principal Axis Extraction and the Principal Axes

The second step is the coarse level model averaging. A partition step is performed to partition each individual model into several significant parts (submodels) with a user interface. For each individual model, a set of principal axes is extracted and can be referred to as skeleton of the model. In the step, the individual model is fed into the process system and the system may process the partition procedure under the input instruction of the user. Each individual wireframe model is partition into several significant parts manually, and then the corresponding principal axis for each submodel is found by the technology of PCA disclosed by Ian T Jolliffe, "Principal Component Analysis", Springer-Verlag, New York, 1986. By calculating eigenvalues and the corresponding eigenvectors of the following sample covariance matrix, the direction of the principal axis is determined:

$$S = \frac{1}{m-1}\sum_{k=1}^{m}(x_k - \mu_x)(x_k - \mu_x)^T$$

Where m is the number of vertices on the submodel, X is the position vectors of these vertices, and $\mu_x$ is the sample mean of X. The direction of principal axis, D, is the eigenvector of S with the minimum engenvalue. The principal axis of the submodel is the rotation axis with minimum rotational inertia for the submodel, and it can be represented as a parametric line segment with parameter t:

$$v(t) = A + t \cdot D, \ t_{min} \leq t \leq t_{max}$$

where A is a point on the principal axis, and be set to $\mu_x$. The boundary, $t_{min}$ and $t_{max}$, can be determined by projection of all submodel vertices to the principal axis. For each individual model, a set of principal axes is extracted and can be referred to as skeleton of the model.

Principal Axis Average:

Still referring to FIG. 2, after the principal axes are determined by the computation performed on the process system or computer. The registration of each individual model should be performed before the averaging procedures. Each individual model can establish a local coordinate system from the relative positions of its own principal axes. Then, each individual model is translated and rotated by the computing system. After applying some translocation and rotation, the original local coordinate system are registered to be consistent with the global axis, the parametric line segment can be computed:

$$v(t) = M + t \cdot D, \ t'_{min} \leq t \leq t'_{max}$$

where M is the middle point on the principal axis, and $$t'_{max} = \frac{1}{2}(t_{max} - t_{min}) = -t'_{min}$$

Figure 3:
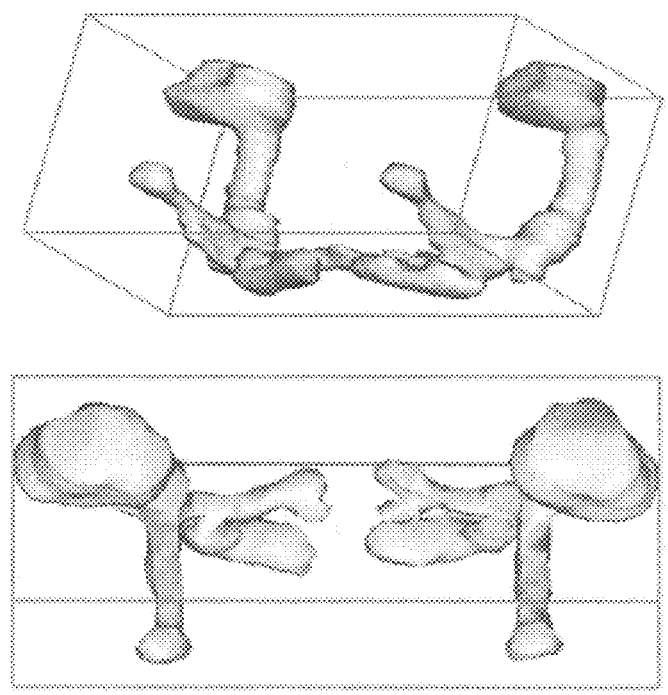
FIG. 3 shows the wireframe model of the mushroom body.
Figure 4:
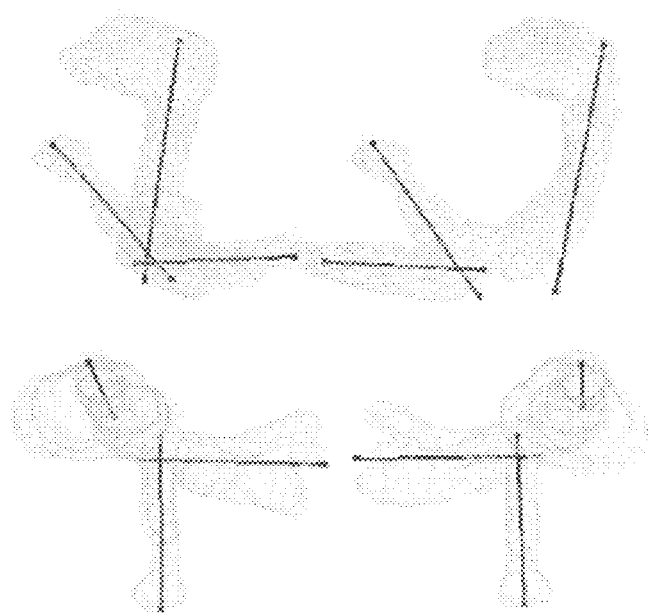
FIG. 4 shows the principal axes and wireframe of the same model of FIG. 3.
Figure 5:
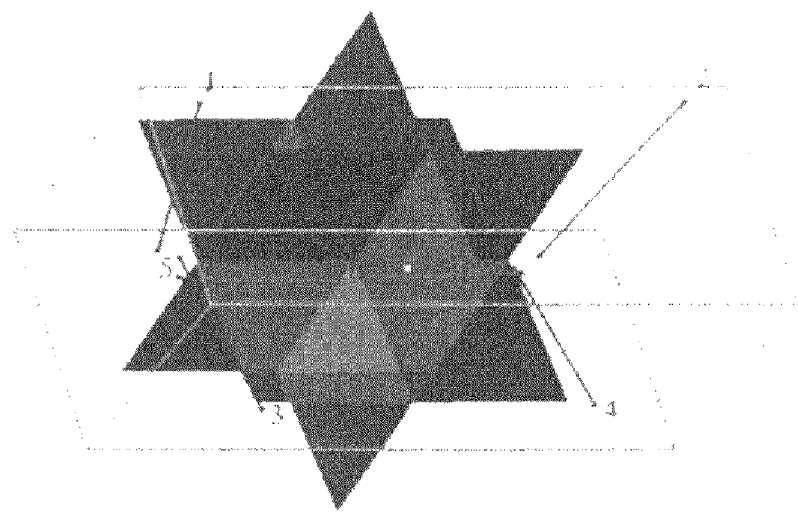
FIG. 5 shows the local coordinate system of the set of principal axes.

Averaging procedures are carried out by calculating the average position of the middle points, the average direction and the average length of the principal axis, performed on the computer or the process system of the present invention. Consequently, the average principal axis can be represented as:

$$v(t) = \mu_M + t \cdot \mu_D, \ \overline{t_{min}} \leq t \leq \overline{t_{max}}$$

where $$\mu_M = \frac{1}{n}\sum_{k=1}^{n}M_k,$$

$$\mu_D = \frac{\sum_{k=1}^{n}D_k}{\left\|\sum_{k=1}^{n}D_k\right\|},$$

$$\overline{t_{max}} = \frac{1}{n}\sum_{k=1}^{n}t'_{max,k} = -\overline{t_{min}},$$

wherein n is the number of individual models. After the process system finish computing the average principal axes for the submodel, the average skeleton of the original datasets is generated by the process system and stored into the memory of the process system 100 or into the database 600 in FIG. 1. FIG. 3 shows the wireframe model of the mushroom body. FIG. 4 shows the principal axes and wireframe of the same model of FIG. 3. FIG. 5 shows the local coordinate system of the set of principal axes.

Three Dimension Field-Based Warping

The next procedure after the average skeleton of original datasets being generated is to warp the stored individual skeleton dataset in three dimensions by the process system 100 of the present invention. Based on the 3D field-based warping algorithm disclosed by J. Gomes et al., entitled "Warping and Morphing of Graphical Objects", Morgan Kaufman Publishers, San Francisco, 1999, the calculation performed on the process system 100 is able to warp each individual model to its corresponding pseudo-average model. The warping function processed by the computer is defined as:

$$W(p) = p + \frac{\sum_{k=1}^{r} w_k \Delta p_k}{\sum w_k}, \ \Delta p_k = W_k(p) - p$$

Wherein p is the position vector of vertices on an individual model, and r is the number of principal axes in a set of skeleton. $W_k(p)$ is the warped position of p using a single principal axis pair. The weighting of the k-th principal axis of W(p) is defined as:

$$w_k = \left(\frac{l_k^c}{a + d_k}\right)^b$$

Wherein $l_k$ is the length of the principal axis and its importance is adjusted by the constant c. $d_k$ is the distance from a point p to the principal axis. The constant a means the adherence of the principal axis, and the constant b can be seen as the concentration of the strength of the principal axis.

Final-Level Model Averaging

The pseudo-average model is generated by the process system 100 based on the above model. Then, the pseudo-average models are registered according to the common average skeleton. The final average model can be obtained by determining the geometric median of these pseudo-average models, on the process system 100. For a wireframe model, the triangle patches are converted into volumetric voxels by sampling. A 3D seed-fill algorithm is applied to convert this volumetric hollow object to a volumetric solid object. Each pseudo-average model will generate a volumetric solid object to indicate the volumetric voxels it possesses. A cumulative volume of voxel values from 1 to N is obtained with N pseudo-average models superimposed. The geometric median is located at where the voxel value is N/2. Once the geometric median is determined by the process system 100 and the 3D graphic generating system 200, the final average model can be built.

Virtual Reality Demonstration Facility

A full colored three dimensional stereo neuron graphic can be seen and manipulated with the facilities. In order to reveal the very fine extension of neurites, several facilities are used for the data generating system 400. A Zeiss LSM 510 confocal microscope is equipped with 4 laser light sources including an argon laser (emission at 364 nm), an argon-krypton laser (458, 488, or 514 nm), and two HeNe lasers (543 and 633 nm). The system allows for simultaneous detection of four fluorescence signals and a transmitted image. Zeiss LSM 510 META confocal two-photon microscope system is equipped with 4 laser light sources including an argon-krypton laser (458, 488, or 514 nm), two HeNe lasers (543 and 633 nm), and with a Coherent Mira femtosecond T-Sapphire laser for nonlinear optical microscopy (2-photon) which is capable of 700-1000 nm single optics set tuning. This is designed for in vivo observation of fluorescence signals in thick living tissues. Zeiss LSM 510 META confocal microscope is equipped with 3 laser light sources including an argon-krypton laser (458, 488, or 514 nm), and two HeNe lasers (543 and 633 nm). The system has 3 photomultipliers and a META detector allowing simultaneous collection of full spectrum fluorescence signals. It does not have transmitted light detector. It has an automated stage scanner for image montage and optical system for IR light. For the stereoscopic image presentation, a stereoscopic projecting system 300 is coupled to the process system 100. The process system 100 may access the database under the input instruction and send the image to a video card with multiple graphic outputs (such as NVIDIA Quadro4-980 or better). The CPU in the process system 100 can be a 32-bit or 64-bit (or better) unit(s), with sufficient memories for image data processing. The image from the multiple outputs is individually fed into multiple projectors so that a front or back projection can be implemented for stereoscopic presentation and manipulation. The procedure can be controlled by (but not limited to) commercially available software (such as AMIRA v.3.1) and hardware (such as a 3D mouse). Special glasses as known in the art should be provided for generating the virtual three dimension image. It is well-known in the art, the description is omitted.

Please refer to FIG. 1 again, it also includes a module 700 for generating standard brain model and coordinate system coupled to the processing system. For example, the module 700 may process the procedures to generate the standard Drosophila brain model with coordinate information. A deterministic reference framework is pursued for data integration and comparison. A shape averaging algorithm will be provided for creating the standard template including axial and non-axial structures. The standard Drosophila brain comprises the standard surface and the standard neuropils. The standard neuropils are located within the standard surface with the average position and orientations. A global coordinate system of the brain surface and several local coordinate systems of the specific neuropils compose the coordinate system of the Drosophila standard brain. The standard surface and neuropils can be obtained by performing shape-averaging algorithm to the constructed 3D surface models from individual brains. The neuropils can be separated into two categories, axial and non-axial. The axial neuropils, such as the mushroom bodies, are easy to find the correspondence between each other through the axial structures. The model-averaging of the axial neuropils can be performed by employing the axial features. For the non-axial neuropils, such as the optical lobes and the brain surface, the transformation relationship between them can only be found by a surface registration process.

Figure 9:
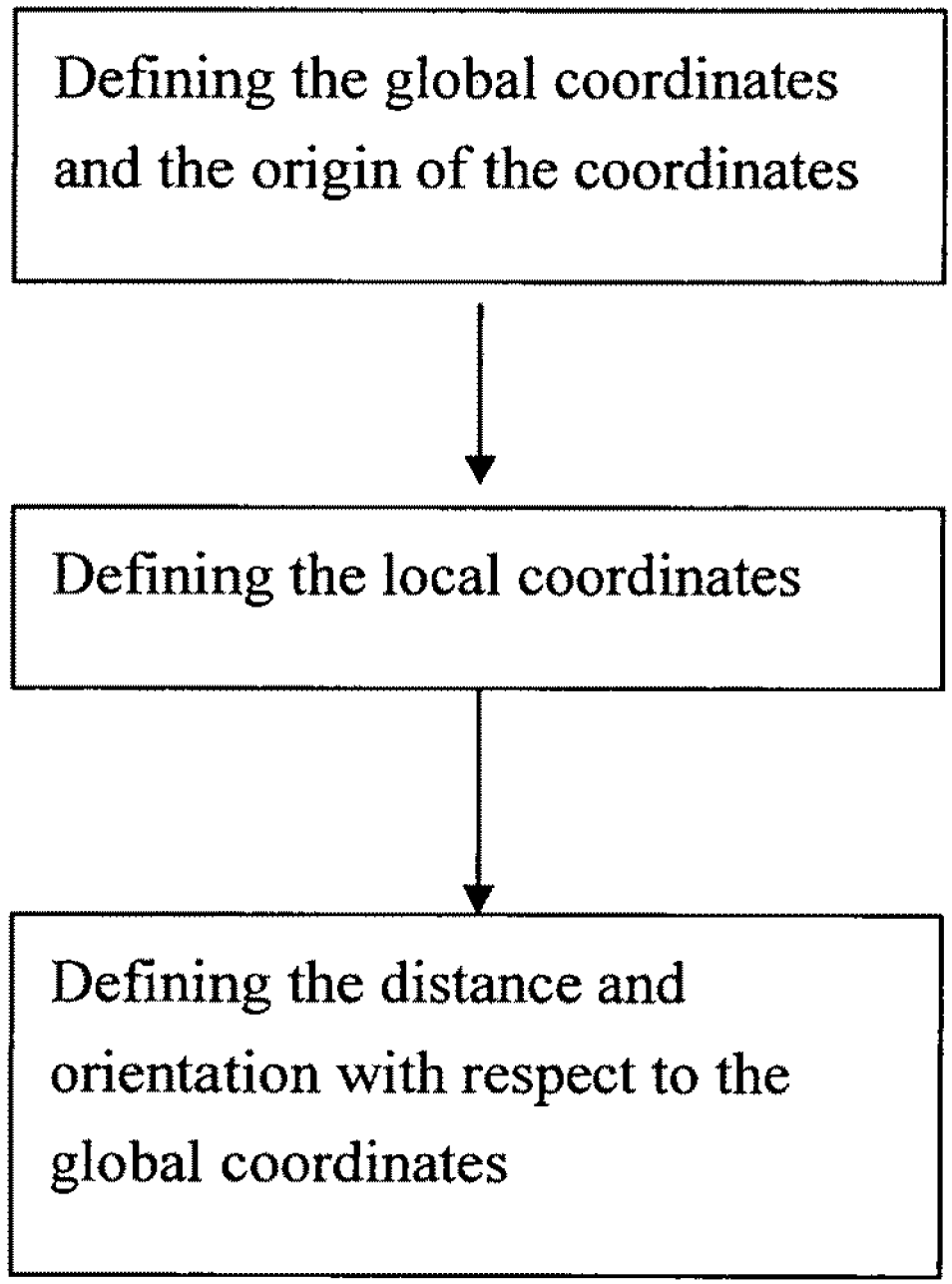
FIG. 9 demonstrates the flow charts for determining the global and local coordinates of the present invention.

Before the construction of the brain model, the present invention discloses a novel method to create standard brain model. Please refer to FIG. 9, a global coordinate is defined in the initial step. The global coordinate may define entire circuits for the whole brain. The original of the global coordinates is also defined within the step. Subsequently, a local coordinate is defined to stand for each sub-element, for example, neuropils. The distance and the orientation of the local coordinate with respect to the global coordinate can be determined. In this stage, the global and local characteristics of the models, such as orientations, positions, sizes, and angles between axial structures, are determined. Therefore, each location of the neuron is defined for subsequent observation. The technique to construct the standard model is described as follow.

Figure 10:
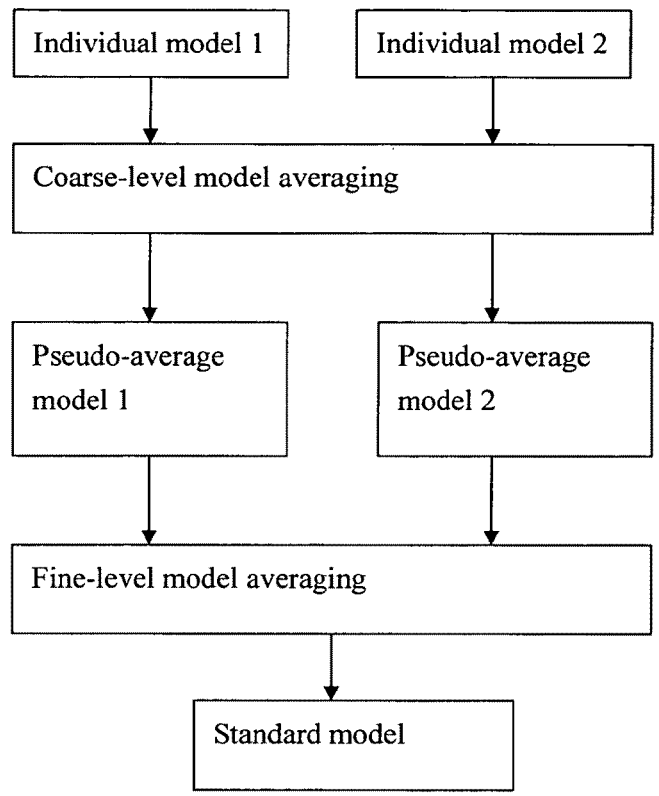
FIG. 10 demonstrates the flow charts for two level model averaging of the present invention.

A two-level model averaging technique is introduced for the construction of the standard template. The two level hierarchy of the algorithm is shown in FIG. 10. The individual 3D models are first processed with a coarse-level model averaging procedure. In this stage, we average the global characteristics of the models, such as orientations, positions, sizes, and angles between axial structures. In one example, two individual models, i.e. individual model 1 and individual model 2, are input to the system and the input data are processed by coarse-level model averaging procedure.

"The two groups of the anatomic structures, non-axial and axial structures, have different procedures for the coarse-level averaging. For non-axial structures, a reference model must be created from the individual models first. The candidate of the reference model is chosen to be the individual model which has the volume size closest to the average volume size. After scaling the candidate model to the average volume size, we can obtain the reference model. A 3D distance field is generated from the reference model to facilitate the registration procedure. It records the distance from each voxel to its nearest surface voxel on the reference model.

The position vector is denoted as X, and DF (x) indicates the 3D distance field. An affine transformation mapping from position x to position y is defined as $$\begin{pmatrix} y_1 \\ y_2 \\ y_3 \\ 0 \end{pmatrix} = \begin{pmatrix} p_1 & p_4 & p_7 & p_{10} \\ p_2 & p_5 & p_8 & p_{11} \\ p_3 & p_6 & p_9 & p_{12} \\ 0 & 0 & 0 & 1 \end{pmatrix} \begin{pmatrix} x_1 \\ x_2 \\ x_3 \\ 1 \end{pmatrix} \text{ or } y = Mx$$

For registration of an individual model, the set of transform parameters is the solution which minimize s the following objective function $$C = \sum_{x_j \in U} (DF(Mx_i))^2$$

where U denotes the set of all surface vertices on the individual model.

For axial structures, we partition each individual model into several significant parts with a user interface, and compute principal axes of these parts by the technique of principal component analysis. For each individual model, a set of principal axes is extracted and can be referred to as the skeleton of the model. By taking the skeletons of all models into account, we can compute an average skeleton. The pseudo-average models of the individual models are generated after applying 3D field based warping to all individual models from original skeletons to the average skeleton.

After coarse-level model averaging, each individual model is transformed to a corresponding pseudo-average model. The final standard model can be obtained by determining the shape average of the pseudo-average models. Each pseudo-average model can create a signed distance field that records the distance from each voxel to its nearest voxel on the surface of the pseudo-average model. The value is set to positive if the voxel is inside the pseudo-average model, and vise versa. After cumulateing the signed distance fields of all pseudo-average models, the surface of the final standard model can be extracted by zero-crossing detection of the cumulateive distance field.

The further aspect of the present invention is to create the standard brain model by the module 700 as shown in FIG. 1. One of the examples is to create the Drosophila brain model.

Figure 11:
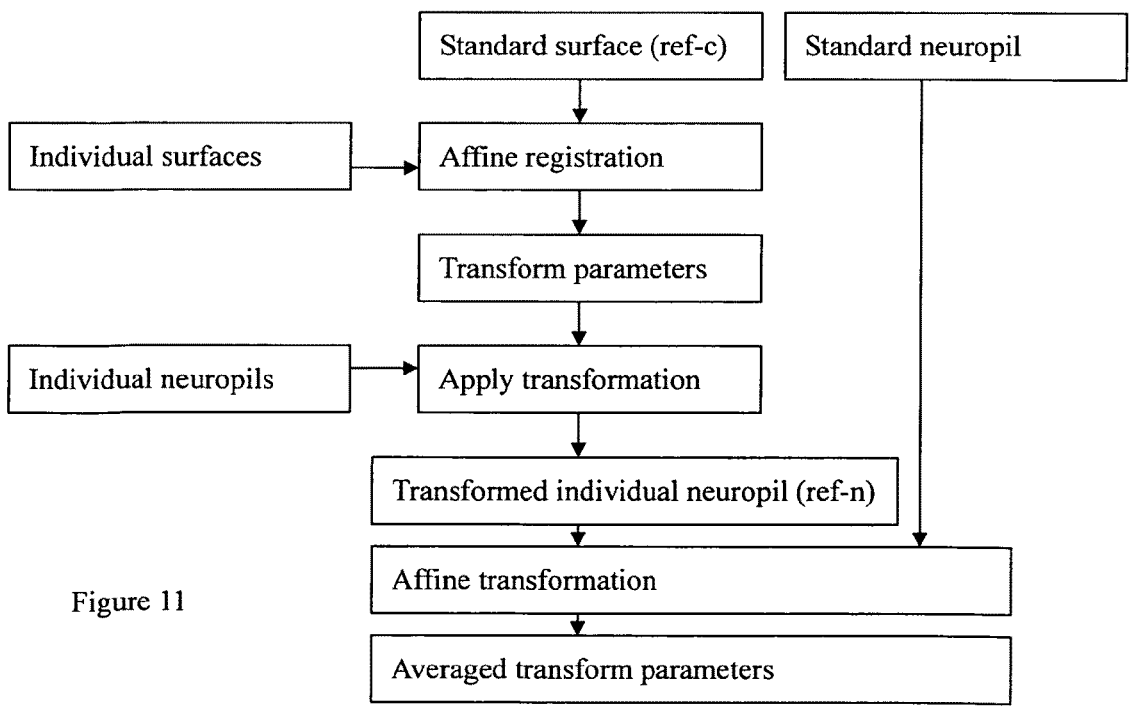
FIG. 11 demonstrates the flow charts for registration of the standard neuropil of the present invention.

The standard brain comprises the standard surface and the standard neuropils. The standard neuropils are located within the standard surface with the average position and orientation. The flowchart for registration of the standard neuropil is depicted in FIG. 11. "The individual datasets needed consist of a surface model and their corresponding neuropil models. The individual surface of an individual dataset is first affine registered to the standard surface. We record the transformation parameters, and apply them to transform the individual neuropil. The standard neuropil is then rigidly registered to the transformed individual neuropil. The resulting transformation can be regarded as a suggestion about the position and orientation of the standard neuropil within the standard surface.

For each standard neuropil, the position and orientation in the standard surface can be calculated by averaging the suggestions from the individual datasets. The average parameter of the translation can be obtained by $$\bar{T} = \frac{1}{n} \sum_{i=1}^{n} T_i$$

where n is the number of individual datasets. $T_i$ is the parameter of translation suggested by the ith individual dataset.

To find the average parameter of rotation, we solve the an optimal R that minimizes the following equation $$\frac{1}{m} \sum_{j=1}^{m} \|y_j - \bar{R}x_j\|^2$$

where $Y_i$ is the corresponding point of x, and m is the number of points in both sets. For the ith individual dataset, the three corresponding points are defined as $x_1 = (1,0,0)' \leftrightarrow y_1 = R_i x_1$ $x_2 = (0,1,0)' \leftrightarrow y_2 = R_i x_2$ $x_3 = (0,0,1)' \leftrightarrow y_3 = R_i x_3$ where $R_i$ is the parameter of rotation suggested by the ith individual dataset.

With the transformation parameters, T and R, we can apply the appropriate rigid transformation to the standard neuropil. The Drosophila standard brain model can be obtained after all the standard neuropils are processed and located into the standard surface.

Algorithms for constructing the global and local coordinate systems for an individual Drosophila brain are presented in [5]. The global coordinate system of the Drosophila brain surface is constructed based on two features: the principal axis of the whole brain surface and the esophagus, which nearly cross the brain surface horizontally. The surface of the esophagus is first constructed, with the same algorithm for the brain surface, and the center of the esophagus is then determined as origin of the whole brain; the z-axis (anterior positive) is the major principal axis of the esophagus; the y-axis is along the line (ventral positive) perpendicular to the z-axis and the major principal axis of the brain at the esophageal center. The x-axis is at the intersection of the two axes and normal to the y-z plane (right positive). For the local coordinate system of the specific neuropil, we have constructed the coordinate system of the mushroom bodies. The local coordinate system is constructed based on the six lobes of the mushroom bodies. We can obtain the global and local coordinate system of the standard Drosophila brain by introducing the algorithms to the standard brain surface and standard neuropils.

There are multiple datasets of male Drosophila used in our method. The individual dataset contains two channels of image stack, one for the brain surface and the other for the mushroom bodies. Each image stack consists of about 60 image slices acquired by the confocal microscopy.

The present invention develops procedures for generating the standard Drosophila brain with coordinate information. The standard Drosophila brain comprises the standard surface and the standard neuropils. The present invention proposes a shape-averaging algorithm to create the axial and non-axial templates. Afterwards, an algorithm is proposed to determine the average positions and orientations of each neuropils within the standard surface. The global and local coordinate systems are constructed for the standard Drosophila brain. The present invention can generate the 3D virtual Drosophila brain after applying the proposed system with a large amount of individual 3D neuronal image. The standard Drosophila brain with coordinate information enables the integration of the whole brain circuits. Finally, the information about the spatial and temporal relationship among neurons can be achieved.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A method for generating standard bio-expression model from a bio-expression system, comprising:

transforming individual models input to said bio-expression system to pseudo-average models to obtain a standard bio-expression model by determining shape average of said pseudo-average models by an average model generating module, wherein each said pseudo-average models creates a signed distance field that records the distance from each voxel to its nearest voxel on surface of said pseudo-average models;

extracting a surface of said standard bio-expression model by zero-crossing detection by a standard bio-expression model generating module, wherein said standard bio-expression model includes a standard surface;

constructing a global coordinate system of a bio-expression surface based on a principal axis of said standard surface by said standard bio-expression model generating module to present entire said standard bio-expression model;

determining a local coordinate to present a sub-structure of said standard bio-expression model by a computer; and determining characteristics of said local coordinate with respect to said global coordinate by said computer for facilitating each location of neurons in said bio-expression system to be defined, and thereby enabling the visualization of information about spatial and temporal relationship among said neurons with the help of a stereoscopic projecting system for observation;

wherein said average model generating module and said standard bio-expression model generating module are coupled to said computer, respectively.

2. The method of claim 1, wherein said original of said global coordinate is defined.

3. The method of claim 2, wherein said characteristic includes position of said local coordinate to said original.

4. The method of claim 1, wherein said characteristic includes orientation of said local coordinate.

5. The method of claim 1, wherein said characteristic includes angle between axial structure of said local coordinate to said original.

6. The method of claim 1, wherein said standard bio-expression model is a standard brain model, furthering comprising:

performing steps of registration to input said standard surface and individual surface into affine registration;

recording a transformation parameters from said affine registration;

performing steps of inputting an individual neuropil and transforming parameters into a affine transformation;

applying data of said affine transformation to transform said individual neuropil to achieve transformed individual neuropil; and performing a step of affine registration to register a standard neuropil to said transformed individual neuropil to achieve a resulting transformation, wherein said resulting transformation is output as a position and orientation of said standard neuropil within said standard surface.

7. The method of claim 6, wherein said standard neuropil is located within said standard surface with average said position and orientation.

8. The method of claim 6, wherein said position and orientation in said standard surface can be calculated by averaging suggestions from individual datasets.

9. The method of claim 6, wherein said standard brain model is obtained after all said standard neuropil are processed and located into said standard surface.

10. The method of claim 6, wherein said bio-expression model is said standard brain model which includes said standard neuropil.

* * * * *